United States Patent
Johnson

(10) Patent No.: US 9,860,727 B2
(45) Date of Patent: Jan. 2, 2018

(54) METHOD AND APPARATUS FOR COMMUNICATING TO AND FROM A MOTORCYCLE

(71) Applicant: Lawrence Antony Johnson, Pflugerville, TX (US)

(72) Inventor: Lawrence Antony Johnson, Pflugerville, TX (US)

(*) Notice: Subject to any disclaimer, the term of this patent is extended or adjusted under 35 U.S.C. 154(b) by 0 days.

(21) Appl. No.: 15/437,520

(22) Filed: Feb. 21, 2017

(65) Prior Publication Data

US 2017/0245129 A1     Aug. 24, 2017

Related U.S. Application Data

(60) Provisional application No. 62/297,855, filed on Feb. 20, 2016.

(51) Int. Cl.
| | |
|---|---|
| *H04W 4/22* | (2009.01) |
| *G01S 19/01* | (2010.01) |
| *G01C 9/02* | (2006.01) |

(52) U.S. Cl.
CPC ............... *H04W 4/22* (2013.01); *G01C 9/02* (2013.01); *G01S 19/01* (2013.01)

(58) Field of Classification Search
CPC .... H04W 4/22; G01C 9/02–9/04; G01S 19/01
See application file for complete search history.

(56) References Cited

U.S. PATENT DOCUMENTS

| | | | |
|---|---|---|---|
| 9,247,779 B1 * | 2/2016 | Aloumanis | G08G 1/137 |
| 9,445,639 B1 * | 9/2016 | Aloumanis | A42B 3/0453 |
| 2016/0007384 A1 * | 1/2016 | Dettloff | H04W 76/007 |
| | | | 455/404.1 |
| 2017/0017766 A1 * | 1/2017 | Giraud | G06F 19/3418 |
| 2017/0132907 A1 * | 5/2017 | Lee | G08B 25/016 |

* cited by examiner

*Primary Examiner* — Mehmood B Khan
(74) *Attorney, Agent, or Firm* — Taboada Law Firm, PLLC; John M. Taboada

(57) ABSTRACT

Methods and systems for motorcycle communication are disclosed, including a) storing contacts, vertical angle limit (VAL), and/or a timer in memory; b) monitoring; c) determining detection of impact; d) if detected, then determining motorcycle condition, turning on visual and audible indicators, determining location, and communicating location and/or condition to a contact; e) if not detected, then determining if exceeded VAL; f) if exceeded, then beginning timer, concurrently monitoring timer and VAL, and determining whether timer has completed; g) if not completed, then continue concurrent timer and VAL monitoring until timer has completed; h) if completed, then determining if VAL exceeded; i) if not exceeded, then returning to step (b); j) if exceeded, then determining the motorcycle condition, turning on the visual and audible indicators, determining location, and communicating location and/or condition to a contact; and k) if not exceeded, then returning to step (b). Other embodiments are described and claimed.

20 Claims, 5 Drawing Sheets

METHOD AND APPARATUS FOR COMMUNICATING TO AND FROM A MOTORCYCLE

I. CROSS REFERENCE TO RELATED APPLICATIONS

This application claims the benefit of the filing date of U.S. Provisional Patent Application Ser. No. 62/297,855, filed on Feb. 20, 2016, entitled "Method and Apparatus for Communicating to and from a Motorcycle," the entire disclosure of which is hereby incorporated by reference into the present disclosure.

II. BACKGROUND

The invention relates generally to the field of communication to and from a motorcycle. More particularly, the invention relates to a method and apparatus for automatically alerting a third party the location and need for help after the occurrence of a motorcycle accident.

III. SUMMARY

In one respect, disclosed is an apparatus for alerting an occurrence of a motorcycle accident, the apparatus comprising: one or more microprocessors; one or more memory units coupled to the one or more microprocessors; one or more audible indicators coupled to the one or more microprocessors; one or more visual indicators coupled to the one or more microprocessors; a GPS module coupled to the one or more microprocessors; a Communication module coupled to the one or more microprocessors; one or more impact sensors coupled to the one or more microprocessors; an angle/tilt sensor coupled to the one or more microprocessors; and one or more buttons and/or switches coupled to the one or more microprocessors; the apparatus adapted to perform the steps of: a) storing a list of one or more contacts, a vertical angle limit, and/or a predefined timer countdown in the one or more memory units; b) using the one or more microprocessors to monitor the one or more impact sensors and/or the angle/tilt sensor; c) determining from the monitoring of the one or more impact sensors if an impact has been detected; d) if the determination made in step (c), above, is that there has been an impact, then determining the motorcycle condition from the one or more impact sensors and/or the angle/tilt sensor, turning on the one or more visual indicators, turning on the one or more audible indicators, retrieving GPS coordinates from the GPS Module to determine location, and communicating location and/or the motorcycle condition to at least one contact of the list of one or more contacts; e) if the determination made in step (c), above, is that there has not been an impact, then determining from the monitoring of the angle/tilt sensor if the vertical angle limit has been exceeded; f) if the determination made in step (e), above, is that the vertical angle limit has been exceeded, then beginning the predefined timer countdown, monitoring the predefined timer countdown while monitoring the vertical angle limit, and determining whether the predefined timer countdown has been completed; g) if the determination made in step (f), above, is that the predefined timer countdown has not been completed, then continue monitoring of the predefined timer countdown while monitoring the vertical angle limit until the predefined timer countdown has been completed and then proceeding to step (h), below; h) if the determination made in step (f), above, is that the predefined timer countdown has completed, then determining if the vertical angle limit is still exceeded; i) if the determination made in step (h), above, is that the vertical angle limit is not exceeded, then returning to step (b), above; j) if the determination made in step (h), above, is that the vertical angle limit is still exceeded, then determining the motorcycle condition from the one or more impact sensors and/or the angle/tilt sensor, turning on the one or more visual indicators, turning on the one or more audible indicators, retrieving GPS coordinates from the GPS Module to determine location, and communicating location and/or the motorcycle condition to at least one contact of the list of one or more contacts; and k) if the determination made in step (e), above, is that the vertical angle limit has not been exceeded, then returning to step (b), above.

In another respect, disclosed is a method for communicating to and from a motorcycle, the method comprising: a) storing a list of one or more contacts, a vertical angle limit, and/or a predefined timer countdown in one or more memory units; b) using one or more microprocessors to connect to a Communication module, to connect to a GPS module, and to monitor one or more impact sensors and/or an angle/tilt sensor; c) determining from the monitoring of the one or more impact sensors if an impact has been detected; d) if the determination made in step (c), above, is that there has been an impact, then determining the motorcycle condition from the one or more impact sensors and/or the angle/tilt sensor, turning on one or more visual indicators, turning on one or more audible indicators, retrieving GPS coordinates from a GPS Module to determine location, and using the Communication module to communicate location and/or the motorcycle condition to at least one contact of the list of one or more contacts; e) if the determination made in step (c), above, is that there has not been an impact, then determining from the monitoring of the angle/tilt sensor if the vertical angle limit has been exceeded; f) if the determination made in step (e), above, is that the vertical angle limit has been exceeded, then beginning the predefined timer countdown, monitoring the predefined timer countdown while monitoring the vertical angle limit, and determining whether the predefined timer countdown has been completed; g) if the determination made in step (f), above, is that the predefined timer countdown has not been completed, then continue monitoring of the predefined timer countdown while monitoring the vertical angle limit until the predefined timer countdown has been completed and then proceeding to step (h), below; h) if the determination made in step (f), above, is that the predefined timer countdown has completed, then determining if the vertical angle limit is still exceeded; i) if the determination made in step (h), above, is that the vertical angle limit is not exceeded, then returning to step (b), above; j) if the determination made in step (h), above, is that the vertical angle limit is still exceeded, then determining the motorcycle condition from the one or more impact sensors and/or the angle/tilt sensor, turning on the one or more visual indicators, turning on the one or more audible indicators, retrieving GPS coordinates from the GPS Module to determine location, and using the Communication module to communicate location and/or the motorcycle condition to at least one contact of the list of one or more contacts; and k) if the determination made in step (e), above, is that the vertical angle limit has not been exceeded, then returning to step (b), above.

In yet another respect, disclosed is a helmet for alerting an occurrence of a motorcycle accident, the helmet comprising: a shell; one or more microprocessors integrated into the shell; one or more memory units coupled to the one or more microprocessors; one or more audible indicators coupled to the one or more microprocessors; one or more visual indicators coupled to the one or more microprocessors; a GPS module coupled to the one or more microprocessors; a Communication module coupled to the one or more microprocessors; one or more impact sensors coupled to the one or more microprocessors; an angle/tilt sensor coupled to the one or more microprocessors; and one or more buttons and/or switches coupled to the one or more microprocessors; the one or more microprocessors adapted to perform the steps of: a) storing a list of one or more contacts, a vertical angle limit, and/or a predefined timer countdown in the one or more memory units; b) connecting to a Communication module; c) monitoring the one or more impact sensors and/or the angle/tilt sensor; d) determining from the monitoring of the one or more impact sensors if an impact has been detected; e) if the determination made in step (d), above, is that there has been an impact, then determining the motorcycle condition from the one or more impact sensors and/or the angle/tilt sensor, turning on the one or more visual indicators, turning on the one or more audible indicators, retrieving GPS coordinates from the GPS Module to determine location, and communicating location and/or the motorcycle condition to at least one contact of the list of one or more contacts; f) if the determination made in step (d), above, is that there has not been an impact, then determining from the monitoring of the angle/tilt sensor if the vertical angle limit has been exceeded; g) if the determination made in step (f), above, is that the vertical angle limit has been exceeded, then beginning the predefined timer countdown, monitoring the predefined timer countdown while monitoring the vertical angle limit, and determining whether the predefined timer countdown has been completed; h) if the determination made in step (g), above, is that the predefined timer countdown has not been completed, then continue monitoring of the predefined timer countdown while monitoring the vertical angle limit until the predefined timer countdown has been completed and then proceeding to step (i), below; i) if the determination made in step (g), above, is that the predefined timer countdown has completed, then determining if the vertical angle limit is still exceeded; j) if the determination made in step (i), above, is that the vertical angle limit is not exceeded, then returning to step (c), above; k) if the determination made in step (i), above, is that the vertical angle limit is still exceeded, then determining the motorcycle condition from the one or more impact sensors and/or the angle/tilt sensor, turning on the one or more visual indicators, turning on the one or more audible indicators, retrieving GPS coordinates from the GPS Module to determine location, and communicating location and/or the motorcycle condition to at least one contact of the list of one or more contacts; and l) if the determination made in step (f), above, is that the vertical angle limit has not been exceeded, then returning to step (c), above.

Numerous additional embodiments are also possible.

IV. BRIEF DESCRIPTION OF THE DRAWINGS

Other objects and advantages of the invention may become apparent upon reading the detailed description and upon reference to the accompanying drawings.

Figure 1:
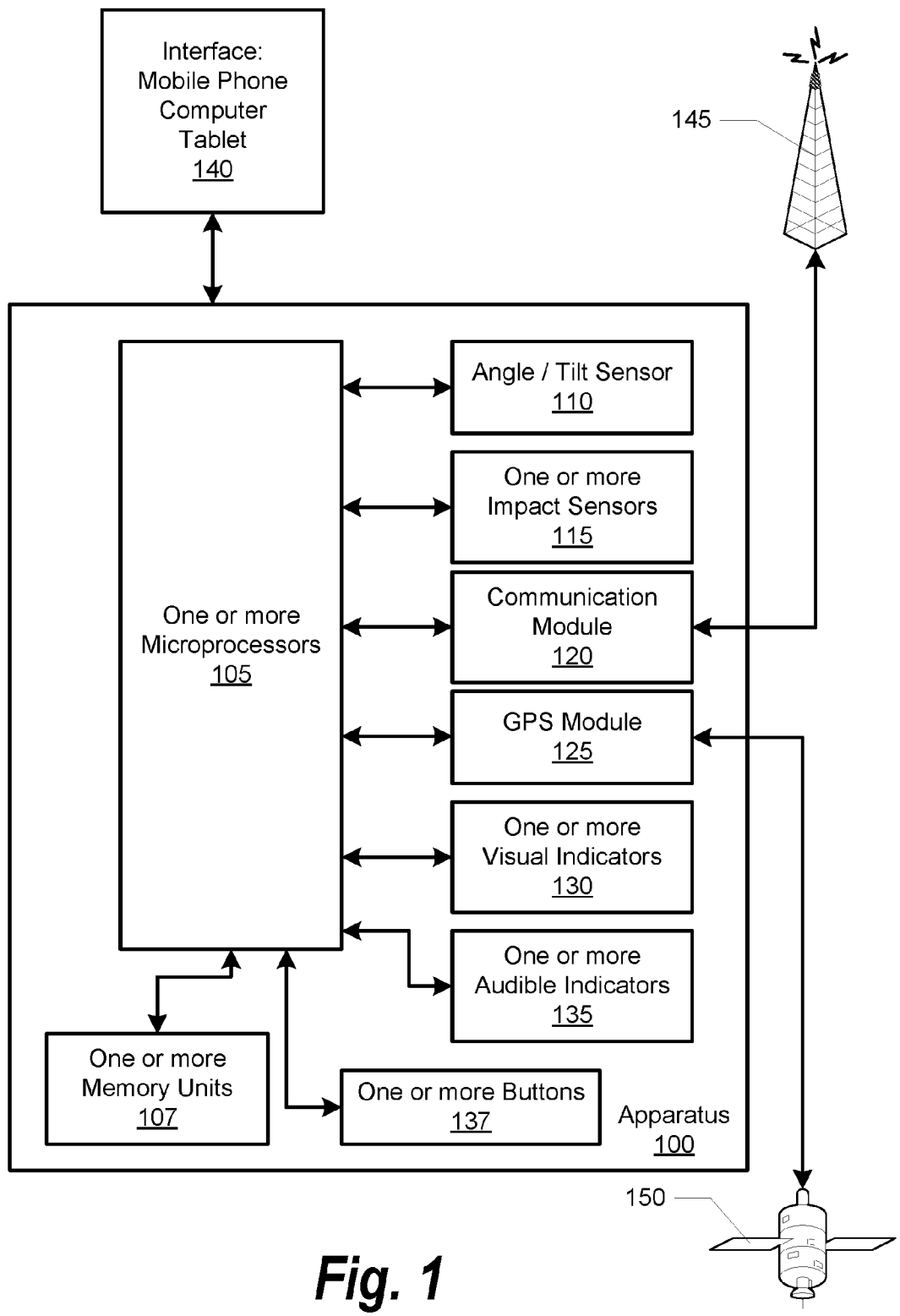
FIG. 1 is a block diagram illustrating an apparatus for communicating to and from a motorcycle, in accordance with some embodiments.

While the invention is subject to various modifications and alternative forms, specific embodiments thereof are shown by way of example in the drawings and the accompanying detailed description. It should be understood, however, that the drawings and detailed description are not intended to limit the invention to the particular embodiments. This disclosure is instead intended to cover all modifications, equivalents, and alternatives falling within the scope of the present invention as defined by the appended claims.

V. DETAILED DESCRIPTION

One or more embodiments of the invention are described below. It should be noted that these and any other embodiments are exemplary and are intended to be illustrative of the invention rather than limiting. While the invention is widely applicable to different types of systems, it would be impossible or impractical to include all of the possible embodiments and contexts of the invention in this disclosure. Upon reading this disclosure, many alternative embodiments of the present invention will be apparent to persons of ordinary skill in the art.

When a motorcyclist is involved in an accident, especially a solo accident where there are no witnesses to the accident, the motorcyclist may potentially not be able to alert others of their need for help. This inability may unfortunately lead to the accident being a fatal accident since care is not timely delivered to the injured motorcyclist. The methods and apparatuses of the invention described herein may solve this shortcoming as well as others by proposing a novel method and apparatus for communicating to and from a motorcycle. Besides being able to alert first responders and loved ones of an accident, the invention described herein allows loved ones to monitor the location and wellbeing of the motorcyclist as they are riding on the motorcycle. Additionally, the invention will also notify the motorcyclist that a loved one had enquired about the motorcyclist's location and wellbeing.

FIG. 1 is a block diagram illustrating an apparatus for communicating to and from a motorcycle, in accordance with some embodiments.

In some embodiments, the apparatus 100 comprises one or more microprocessors 105, one or more memory units 107, an angle/tilt sensors 110, one or more impact sensors 115, a Communication Module 120 (such as GSM, CDMA, GPRS, and/or similar communication link), a GPS Module 125, one or more visual indicators 130, one or more audible indicators 135, and one or more user buttons or switches 137. The one or more microprocessors 105 may also have Bluetooth connectivity which may be used to connect to an external interface 140 such as a mobile phone, computer, or tablet. Other ports, such as USB, may be used to connect the external interface to the apparatus. The external interface 140 is used to set certain predefined values of the cycle alert apparatus such as the angle of the vertical angle limit, the time of the timer countdown, and the names and numbers of the contact list and emergency responders. This information may be stored on the one or more memory units. The interface may also be used to update the apparatus with the latest code and instructions. The one or more microprocessors 105 connect to the Communication Module 120 in order to connect the apparatus 100 to a cell phone network 145 which permits the communication to and from a motorcycle that has an installed apparatus 100. The one or more microprocessors 105 connect to the GPS Module 125 in order to receive GPS signals from one or more satellites, such as satellite 150, and computes the location of the motorcycle from the received GPS signals. The one or more visual indicators 130 may comprise any of the lights that are part of the motorcycle such as the headlight and hazard lights as well as any LEDs on the apparatus, to indicate power to the apparatus, a violation in the vertical angle limit, and/or the reception of a remote inquiry. The one or more audible indicators 135 may comprise the horn of the motorcycle or a speaker that is part of the apparatus.

The one or more microprocessors of the apparatus are used to monitor the one or more impact sensors and/or angle/tilt sensor for the detection of an accident or impact of the motorcycle. If an impact is detected, the one or more microprocessors turn on the one or more visual and audible indicators, retrieves GPS coordinates, and communicates the occurrence and location of the accident to a predefined contact list and/or emergency responders such as 911. If a predefined vertical angle limit is exceeded, a predefined timer countdown is initiated. While the predefined timer countdown and the predefined vertical angle limit are being monitored, the one or more microprocessors check to see if after the timer countdown has completed and whether or not the predefined vertical angle limit is still exceeded. If the predefined vertical angle limit is still exceeded, the one or more microprocessors turn on the one or more visual and audible indicators, retrieves GPS coordinates, and communicates the occurrence and location of the accident to a predefined contact list and/or emergency responders. By directly making contact with the emergency responders, it may be possible for a motorcyclist to survive the accident since the response time of the emergency responders will be shortened. The communicated data may be in latitude and longitude format and/or a link to an online map service, such as Google Maps, to provide a visual of the surrounding location of the motorcycle. The communicated data may also include information with regards to which of the one or more sensors had been triggered, thus providing useful information to those on the contact list and/or emergency responders regarding what events the motorcycle had undergone, such as an impact, rollover, or drop of the motorcycle. The audible indicators and/or visual indicators let the injured motorcyclist know that the apparatus has contacted the predefined contact list and/or emergency responders for help and when help does arrive, the audible indicators and/or visual indicators may help those that are looking for the motorcycle and motorcyclist. This may be very important if the motorcycle and motorcyclist are lost in a ditch or thick brush.

In some embodiments, one of the one or more user buttons or switches 137 may be used by the motorcyclist to easily press the button so that the location and condition of the motorcycle can be sent to a predefined person on the predefined contact list. This simple push button notification allows the motorcyclist to be able to communicate this information with limited to no distraction of the motorcyclist.

In some embodiments, one of the one or more impact sensors 115 may be mounted onto or be integrated into the motorcyclist's helmet and if an impact is detected by this sensor while it is being worn, then the one or more microprocessors turn on the one or more visual and audible indicators, retrieves GPS coordinates, and communicates the occurrence and location of the accident to a predefined contact list and/or emergency responders such as 911. In order to avoid a false call for help from the dropping of the helmet onto the floor, the sensor in this embodiment would only be active if the user has the helmet on. In this embodiment, the sensor mounted onto or into the helmet may communicate with the one or more microprocessors using Bluetooth or some other wireless protocol such as ZigBee.

In some embodiments, the apparatus 100 is a motorcycle helmet. In this embodiment, the apparatus is either attached to and/or integrated into the motorcyclist's helmet. In such an embodiment, the one or more microprocessors along with the angle/tilt sensor, the one or more impact sensors, the Communication Module, the GPS Module, the one or more visual indicators, and the one or more audible indicators are attached to or integrated into the helmet. By having the apparatus 100 be part of the helmet, the motorcyclist is able to take along their motorcycle location and condition alert capability to whichever motorcycle they may be riding on.

In some embodiments, the apparatus 100 is integrated with the motorcycle as an original part of the equipment versus being an after-market device. In such an embodiment, an individual is able to purchase a motorcycle with all the benefits and uses of the apparatus seamlessly integrated into and with the equipment of the motorcycle.

Besides the apparatus monitoring for the occurrence of an accident or impact, the apparatus may also monitor for a remote request for the location and condition of the motorcycle. For example, if a third party, such as a loved one of the motorcyclist, wants to check the status of the motorcyclist's journey, they may send a request to the apparatus for such information. The one or more microprocessors of the apparatus monitor the Communication Module for any such request and if one is received, the one or more microprocessors retrieve GPS coordinates and communicates the location and condition (i.e. whether and an accident or collision has occurred) to the loved one. The apparatus may then also send the motorcyclist a text or notification that an inquiry was made and by whom, i.e. name and/or number. This remote request feature of the apparatus may also be used to locate and track a stolen motorcycle as the motorcycle's owner may be the one making the remote request. Another possible feature of the apparatus would be to allow the owner of the motorcycle to remotely disable the motorcycle.

The apparatus is also capable of receiving a remote request for the notification of when the motorcycle arrives at a particular location. For example, if an individual wants to know when the motorcyclist has arrived to a certain destination, the apparatus will send a notification to the requester of when the motorcyclist has arrived at a particular location or destination. The one or more microprocessors of the apparatus monitor the Communication Module for any such arrival notification request and if one is received, the one or more microprocessors monitor the GPS coordinates and when they coincide with the requested location or destination, the one or more microprocessors communicate the arrival of the motorcyclist to the location or destination. The apparatus may then also send the motorcyclist a text or notification that an arrival notification request was made and by whom, i.e. name and/or number.

The apparatus is also capable of activating one or more audible indicators and/or one or more visual indicators from a remote request. The one or more microprocessors of the apparatus monitor the Communication Module for any remote activation request and if one is received, the one or more microprocessors will initiate the activation of the one or more audible indicators and/or one or more visual indicators. The apparatus may then also send the motorcyclist a text or notification that an activation request was made and by whom, i.e. name and/or number.

Figure 2:
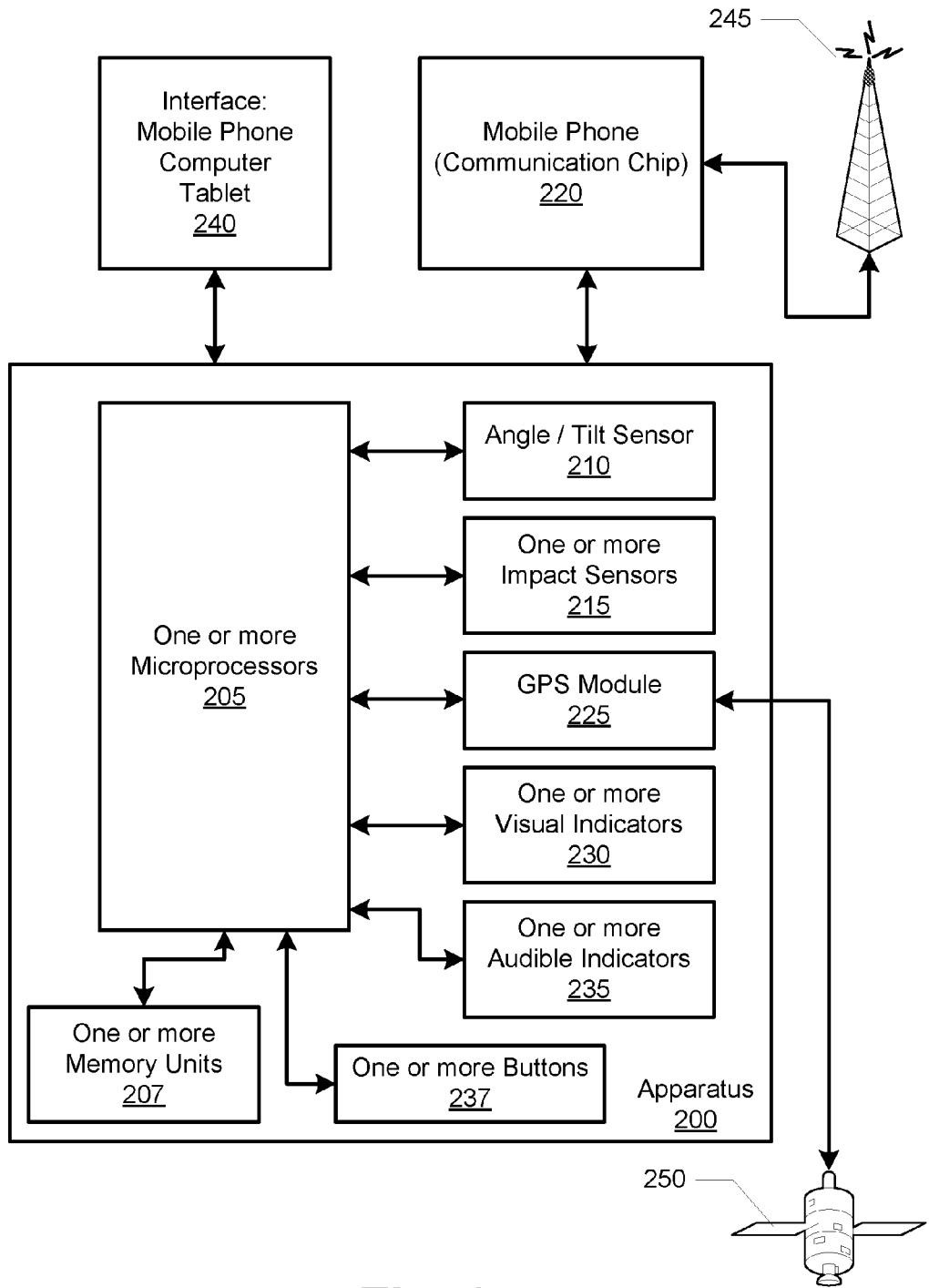
FIG. 2 is a block diagram illustrating a system for communicating to and from a motorcycle, in accordance with some embodiments.

FIG. 2 is a block diagram illustrating a system for communicating to and from a motorcycle, in accordance with some embodiments.

In some embodiments, the apparatus does not have its own communication chip, i.e.

Communication Module, but rather uses one of a connected mobile phone. In such an embodiment, the apparatus 200 comprises one or more microprocessors 205, one or more memory units 207, an angle/tilt sensors 210, one or more impact sensors 215, a GPS Module 225, one or more visual indicators 230, one or more audible indicators 235, and one or more user buttons or switches 237. The one or more microprocessors 205 may also have Bluetooth connectivity which may be used to connect to an external interface 240 such as a mobile phone, computer, or tablet. Other ports, such as USB, may be used to connect the external interface to the apparatus. The external interface 240 is used to set certain predefined values of the cycle alert apparatus such as the angle of the vertical angle limit, the time of the timer countdown, and the names and numbers of the contact list and emergency responders. This information may be stored on the one or more memory units. The interface may also be used to update the apparatus with the latest code and instructions. Using the Bluetooth connectivity of the apparatus, the apparatus 200 may use the communication link of an externally connected mobile phone 220. The mobile phone may use either GSM, CDMA, GPRS, and/or similar communication link. The mobile phone 220 connects the apparatus 200 to a cell phone network 245 which permits the communication to and from a motorcycle that has an installed apparatus 200. The one or more microprocessors 205 connect to the GPS Module 225 in order to receive GPS signals from one or more satellites, such as satellite 250, and computes the location of the motorcycle from the received GPS signals. The one or more visual indicators 230 may comprise any of the lights that are part of the motorcycle such as the headlight and hazard lights as well as any LEDs on the apparatus, to indicate power to the apparatus, a violation in the vertical angle limit, and/or the reception of a remote inquiry. The one or more audible indicators 235 may comprise the horn of the motorcycle or a speaker that is part of the apparatus. The same uses, operational methods, and configurations of the apparatus described in FIG. 1 may also be used for the embodiment disclosed in FIG. 2.

Figure 3:
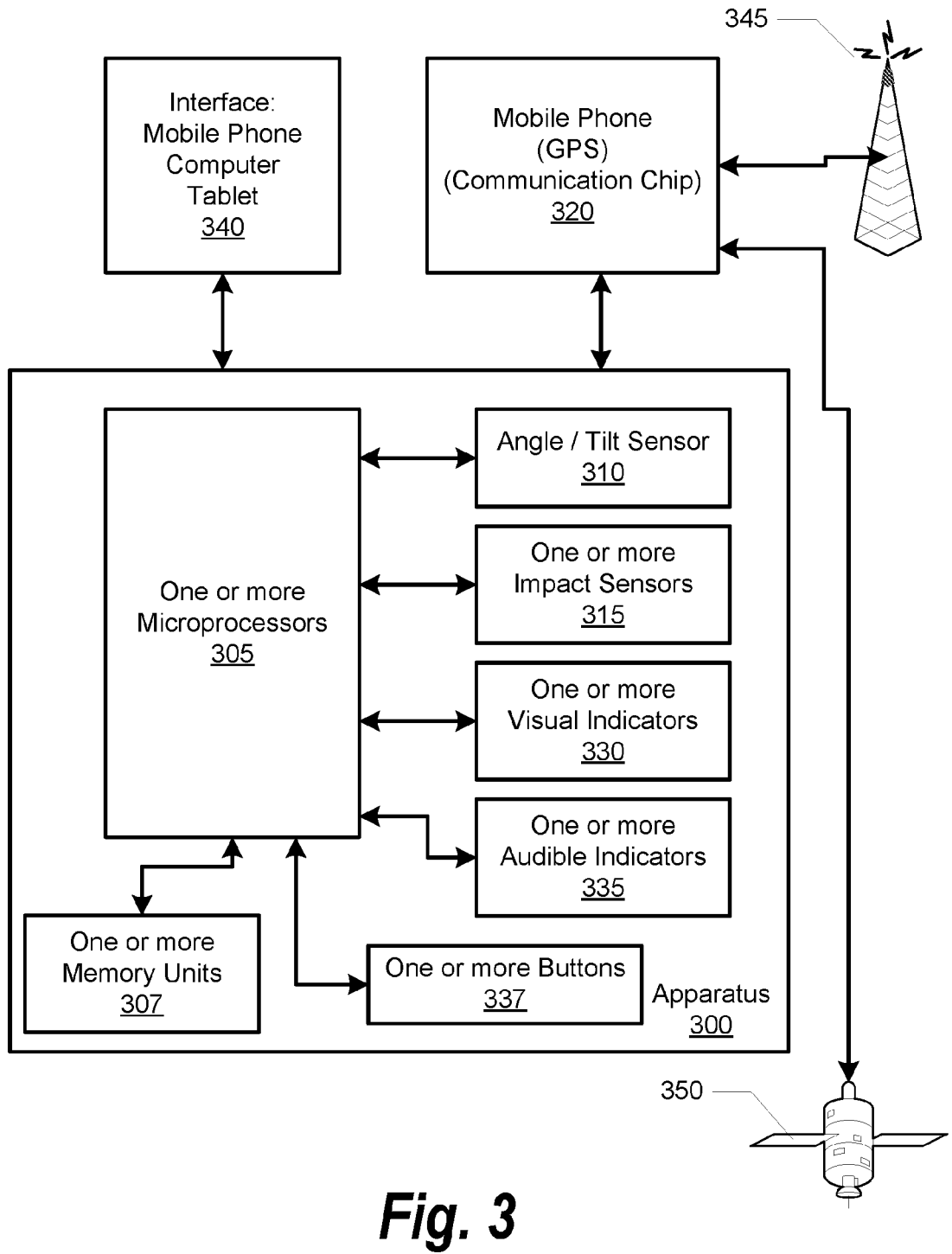
FIG. 3 is a block diagram illustrating a system for communicating to and from a motorcycle, in accordance with some embodiments.

FIG. 3 is a block diagram illustrating a system for communicating to and from a motorcycle, in accordance with some embodiments.

In some embodiments, the apparatus does not have its own GPS Module and communication chip, i.e. Communication Module, but rather uses those of a connected mobile phone. In such an embodiment, the apparatus 300 comprises one or more microprocessors 305, one or more memory units 307, an angle/tilt sensors 310, one or more impact sensors 315, one or more visual indicators 330, one or more audible indicators 335, and one or more user buttons or switches 337. The one or more microprocessors 305 may also have Bluetooth connectivity which may be used to connect to an external interface 340 such as a mobile phone, computer, or tablet. Other ports, such as USB, may be used to connect the external interface to the apparatus. The external interface 340 is used to set certain predefined values of the cycle alert apparatus such as the angle of the vertical angle limit, the time of the timer countdown, and the names and numbers of the contact list and emergency responders. This information may be stored on the one or more memory units. The interface may also be used to update the apparatus with the latest code and instructions. Using the Bluetooth connectivity of the apparatus, the apparatus 300 may use the GPS and communication link of an externally connected mobile phone 320. The mobile phone may use either GSM, CDMA, GPRS, and/or similar communication link. The mobile phone 320 connects the apparatus 300 to a cell phone network 345 which permits the communication to and from a motorcycle that has an installed apparatus 300. The mobile phone 320 along with its GPS receives GPS signals from one or more satellites, such as satellite 350, and computes the location of the motorcycle from the received GPS signals. The one or more visual indicators 330 may comprise any of the lights that are part of the motorcycle such as the headlight and hazard lights as well as any LEDs on the apparatus, to indicate power to the apparatus, a violation in the vertical angle limit, and/or the reception of a remote inquiry. The one or more audible indicators 335 may comprise the horn of the motorcycle or a speaker that is part of the apparatus. The same uses of the apparatus, operational methods, and configurations described in FIG. 1 may also be used for the embodiment disclosed in FIG. 3.

Figure 4:
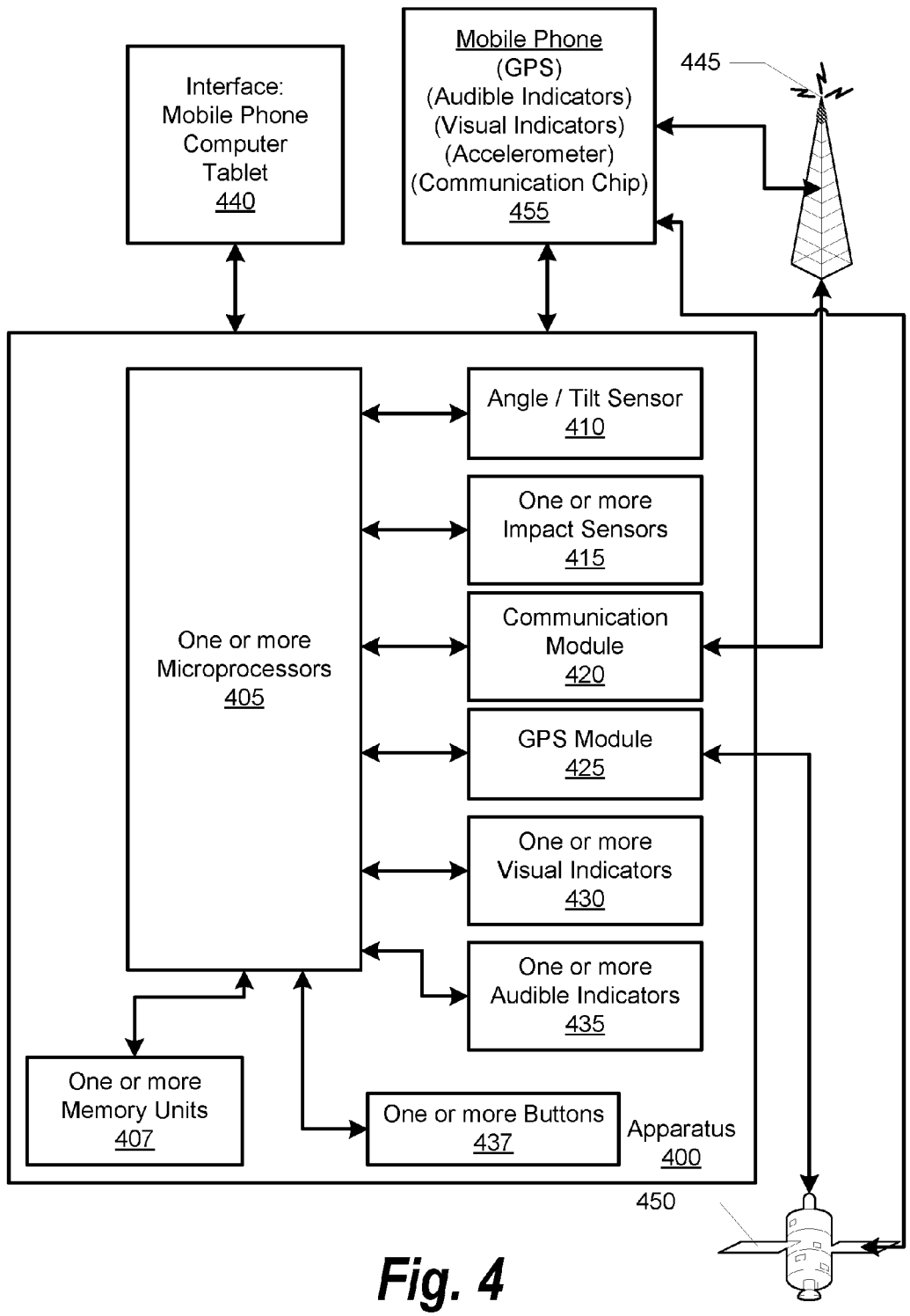
FIG. 4 is a block diagram illustrating a system for communicating to and from a motorcycle, in accordance with some embodiments.

FIG. 4 is a block diagram illustrating a system for communicating to and from a motorcycle, in accordance with some embodiments.

In some embodiments, the apparatus uses the GPS, communication chip, accelerometer, audible indicators, and/or visual indicators as a secondary sensor and communication system. In such an embodiment, the apparatus 400 comprises one or more microprocessors 405, one or more memory units 407, an angle/tilt sensors 410, one or more impact sensors 415, a Communication Module 420 (such as GSM, CDMA, GPRS, and/or similar communication link), a GPS Module 425, one or more visual indicators 430, one or more audible indicators 435, and one or more user buttons or switches 437. The one or more microprocessors 405 may also have Bluetooth connectivity which may be used to connect to an external interface 440 such as a mobile phone, computer, or tablet. Other ports, such as USB, may be used to connect the external interface to the apparatus. The external interface 440 is used to set certain predefined values of the cycle alert apparatus such as the angle of the vertical angle limit, the time of the timer countdown, and the names and numbers of the contact list and emergency responders. This information may be stored on the one or more memory units. The interface may also be used to update the apparatus with the latest code and instructions. Using the Bluetooth connectivity of the apparatus, the apparatus 400 may use the GPS, communication chip, accelerometer, audible indicators, and/or visual indicators of an externally connected mobile phone 455. The mobile phone may use either GSM, CDMA, GPRS, and/or similar communication link. The one or more microprocessors 405 connect to the Communication Module 420 in order to connect the apparatus 400 to a cell phone network 445 which permits the communication to and from a motorcycle that has an installed apparatus 400. The one or more microprocessors 405 connect to the GPS Module 425 in order to receive GPS signals from one or more satellites, such as satellite 450, and computes the location of the motorcycle from the received GPS signals.

The one or more visual indicators 430 may comprise any of the lights that are part of the motorcycle such as the headlight and hazard lights as well as any LEDs on the apparatus, to indicate power to the apparatus, a violation in the vertical angle limit, and/or the reception of a remote inquiry. The one or more audible indicators 435 may comprise the horn of the motorcycle or a speaker that is part of the apparatus. The mobile phone's 455 GPS, communication chip, accelerometer, audible indicators, and/or visual indicators may also be used as a secondary sensor and communication system of the apparatus 400. The same uses of the apparatus, operational methods, and configurations described in FIG. 1 may also be used for the embodiment disclosed in FIG. 4.

Figure 5:
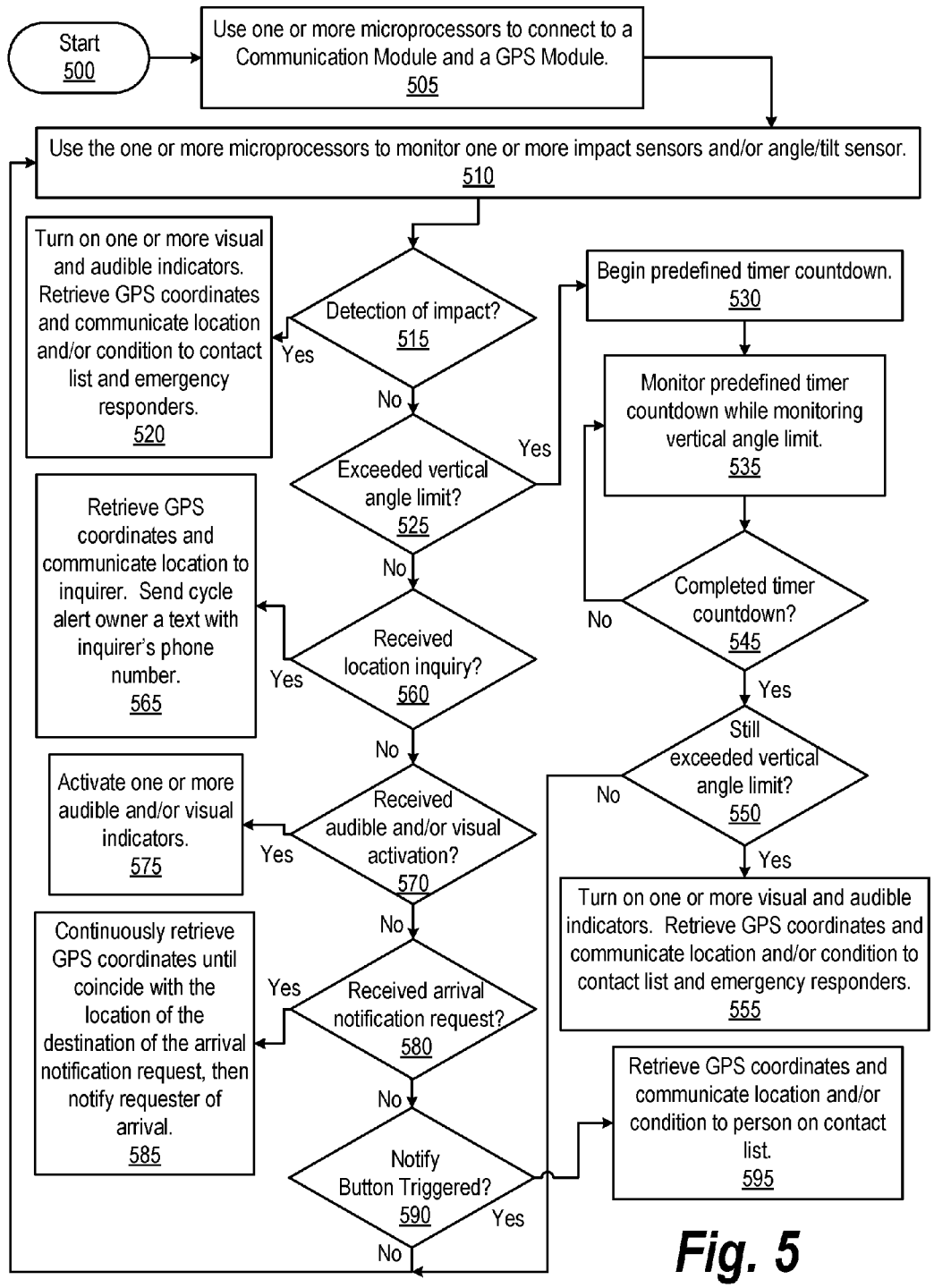
FIG. 5 is a flow diagram illustrating a method for communicating to and from a motorcycle, in accordance with some embodiments.

FIG. 5 is a flow diagram illustrating a method for communicating to and from a motorcycle, in accordance with some embodiments. In some embodiments, the method illustrated in FIG. 5 may be performed by one or more of the devices illustrated in FIG. 1, FIG. 2, FIG. 3, and FIG. 4.

Processing begins at 500 whereupon, at block 505, one or more microprocessors of an apparatus are used to connect to a Communication Module and a GPS Module. In some embodiments, the Communication Module and the GPS Module are part of the apparatus and in other embodiments, these components are part of an external mobile phone. In such an embodiment, the one or more microprocessors along with some connectivity such as Bluetooth is used to access the GPS and communication link (GSM, CDMA, GPRS, and/or similar communication link) of the external mobile phone. Also, it is noted that the embodiments may be described as a process which is depicted as a flowchart, a flow diagram, a data flow diagram, a structure diagram, or a block diagram. Although a flowchart may describe the operations as a sequential process, many of the operations can be performed in parallel or concurrently. In addition, the order of the operations may be rearranged. A process is terminated when its operations are completed, but could have many additional steps not included in the figure. A process may correspond to a method, a function, a procedure, a subroutine, a subprogram, etc. When a process corresponds to a function, its termination corresponds to a return of the function to the calling function or the main function.

At block 510, the one or more microprocessors are used to monitor one or more impact sensors and/or angle/tilt sensor of the apparatus. In some embodiments, the one or more microprocessors monitor the accelerometer of the external mobile phone instead of or in addition to the one or more impact sensors and/or angle/tilt sensor of the apparatus.

At decision 515, a determination is made as to whether an impact has been detected. If an impact has been detected, at block 520, the apparatus turns on one or more visual and audible indicators, retrieves GPS coordinates, and communicates location and/or condition information to a predefined contact list and/or emergency responders such as 911.

If no impact has been detected at decision 515, then at decision 525, a determination is made as to whether a predefined vertical angle limit has been exceeded. If the vertical angle has been exceeded, at block 530 a predefined timer countdown begins. Next, at block 535, the predefined timer countdown is monitored while also monitoring the vertical angle limit. At decision 545, a determination is made as to whether the timer countdown has completed. If not, processing returns to block 535. If so, then at decision 550, a determination is made as to whether the vertical angle limit is still exceeded. If not, processing returns to block 510. If so, then at block 555, the apparatus turns on one or more visual and audible indicators, retrieves GPS coordinates, and communicates location and/or condition information to a predefined contact list and/or emergency responders such as 911.

If no predefined vertical angle limit has been exceeded, then at decision 560, a determination is made as to whether a location inquiry has been received. If a location inquiry has been received, at block 565, the apparatus retrieves GPS coordinates and communicates the location to the inquirer. In some embodiments, the condition of the motorcycle will also be sent to the inquirer. In some embodiments, the apparatus will also send the owner of the apparatus a text with the inquirer's phone number.

If no location inquiry has been made, then at decision 570, a determination is made as to whether an audible and/or visual activation has been received. If an audible and/or visual activation has been received, at block 575, the apparatus activates one or more audible and/or visual indicators.

If no audible and/or visual activation has been received, then at decision 580, a determination is made as to whether an arrival notification request has been received. If an arrival notification request has been received, at block 585, the apparatus continuously retrieves GPS coordinates until they coincide with the location of the destination of the arrival notification request and once they coordinates coincide, the apparatus notifies the requester of the arrival of the motorcyclist to the destination.

If no arrival notification request has been received, then at decision 590, a determination is made as to whether a notify button or switch has been triggered. The one or more microprocessors will monitor the one or more user buttons or switches and if one of the one or more user buttons or switches is activated by the motorcyclist, then at block 595 the location and/or condition of the motorcycle will be sent to a predefined person on the predefined contact list. This simple push button notification allows the motorcyclist to be able to communicate this information with limited to no distraction of the motorcyclist. If no notify button or switch has been triggered, then processing returns to block 510.

Those of skill will appreciate that the various illustrative logical blocks, modules, circuits, and algorithm steps described in connection with the embodiments disclosed herein may be implemented as electronic hardware, computer software, or combinations of both. To clearly illustrate this interchangeability of hardware and software, various illustrative components, blocks, modules, circuits, and steps have been described above generally in terms of their functionality. Whether such functionality is implemented as hardware or software depends upon the particular application and design constraints imposed on the overall system. Those of skill in the art may implement the described functionality in varying ways for each particular application, but such implementation decisions should not be interpreted as causing a departure from the scope of the present invention.

The previous description of the disclosed embodiments is provided to enable any person skilled in the art to make or use the present invention. Various modifications to these embodiments will be readily apparent to those skilled in the art, and the generic principles defined herein may be applied to other embodiments without departing from the spirit or scope of the invention. Thus, the present invention is not intended to be limited to the embodiments shown herein but is to be accorded the widest scope consistent with the principles and novel features disclosed herein.

The benefits and advantages that may be provided by the present invention have been described above with regard to specific embodiments. These benefits and advantages, and any elements or limitations that may cause them to occur or to become more pronounced are not to be construed as critical, required, or essential features of any or all of the claims. As used herein, the terms "comprises," "comprising," or any other variations thereof, are intended to be interpreted as non-exclusively including the elements or limitations which follow those terms. Accordingly, a system, method, or other embodiment that comprises a set of elements is not limited to only those elements, and may include other elements not expressly listed or inherent to the claimed embodiment.

While the present invention has been described with reference to particular embodiments, it should be understood that the embodiments are illustrative and that the scope of the invention is not limited to these embodiments. Many variations, modifications, additions, and improvements to the embodiments described above are possible. It is contemplated that these variations, modifications, additions, and improvements fall within the scope of the invention as detailed within the following claims.

The invention claimed is:

1. An apparatus for alerting an occurrence of a motorcycle accident, the apparatus comprising:
   one or more microprocessors;
   one or more memory units coupled to the one or more microprocessors;
   one or more audible indicators coupled to the one or more microprocessors;
   one or more visual indicators coupled to the one or more microprocessors;
   a GPS module coupled to the one or more microprocessors;
   a Communication module coupled to the one or more microprocessors;
   one or more impact sensors coupled to the one or more microprocessors;
   an angle/tilt sensor coupled to the one or more microprocessors; and
   one or more buttons and/or switches coupled to the one or more microprocessors;
   the apparatus adapted to perform the steps of:
   a) storing a list of one or more contacts, a vertical angle limit, and/or a predefined timer countdown in the one or more memory units;
   b) using the one or more microprocessors to monitor the one or more impact sensors and/or the angle/tilt sensor;
   c) determining from the monitoring of the one or more impact sensors if an impact has been detected;
   d) if the determination made in step (c), above, is that there has been an impact, then determining the motorcycle condition from the one or more impact sensors and/or the angle/tilt sensor, turning on the one or more visual indicators, turning on the one or more audible indicators, retrieving GPS coordinates from the GPS Module to determine location, and communicating location and/or the motorcycle condition to at least one contact of the list of one or more contacts;
   e) if the determination made in step (c), above, is that there has not been an impact, then determining from the monitoring of the angle/tilt sensor if the vertical angle limit has been exceeded;
   f) if the determination made in step (e), above, is that the vertical angle limit has been exceeded, then beginning the predefined timer countdown, monitoring the predefined timer countdown while monitoring the vertical angle limit, and determining whether the predefined timer countdown has been completed;
   g) if the determination made in step (f), above, is that the predefined timer countdown has not been completed, then continue monitoring of the predefined timer countdown while monitoring the vertical angle limit until the predefined timer countdown has been completed and then proceeding to step (h), below;
   h) if the determination made in step (f), above, is that the predefined timer countdown has completed, then determining if the vertical angle limit is still exceeded;
   i) if the determination made in step (h), above, is that the vertical angle limit is not exceeded, then returning to step (b), above;
   j) if the determination made in step (h), above, is that the vertical angle limit is still exceeded, then determining the motorcycle condition from the one or more impact sensors and/or the angle/tilt sensor, turning on the one or more visual indicators, turning on the one or more audible indicators, retrieving GPS coordinates from the GPS Module to determine location, and communicating location and/or the motorcycle condition to at least one contact of the list of one or more contacts; and
   k) if the determination made in step (e), above, is that the vertical angle limit has not been exceeded, then returning to step (b), above.

2. The apparatus of claim 1, wherein the apparatus is further adapted to perform the steps of:
   determining if a location inquiry by an inquirer has been received; and
   if the determination is made that the location inquiry has been received, then retrieving GPS coordinates from the GPS Module to determine location, and communicating location to the inquirer.

3. The apparatus of claim 2, wherein the apparatus is further adapted to perform the steps of:
   messaging an owner of the motorcycle the phone number of the inquirer.

4. The apparatus of claim 1, wherein the apparatus is further adapted to perform the steps of:
   determining if an activation of the one or more audible indicators and/or the one or more visual indicators has been received; and
   if the determination is made that the activation of the one or more audible indicators and/or the one or more visual indicators had been received, then activating the one or more audible indicators and/or the one or more visual indicators.

5. The apparatus of claim 1, wherein the apparatus is further adapted to perform the steps of:
   determining if an arrival notification request has been received; and
   if the determination is made that the arrival notification request has been received, then continuously retrieving GPS coordinates from the GPS Module until the GPS coordinates coincide with coordinates of the arrival notification request, and notifying requestor of arrival once GPS coordinates coincide with coordinates of the arrival notification request.

6. The apparatus of claim 1, wherein the apparatus is further adapted to perform the steps of:

determining if a notification button has been triggered; and if the determination is made that the notification button has been triggered, then retrieving GPS coordinates from the GPS Module to determine location and/or determining the motorcycle condition from the one or more impact sensors and/or the angle/tilt sensor, and communicating to at least one contact of the list of one or more contacts the location and/or the motorcycle condition.

7. The apparatus of claim 1, wherein the one or more audible indicators, the one or more visual indicators, the GPS module, the Communication module, and/or the one or more impact sensors comprise a mobile phone.

8. The apparatus of claim 1, wherein at least one contact of the list of one or more contacts comprises an emergency responder.

9. The apparatus of claim 1, wherein the Communication module comprises GSM, CDMA, and/or GPRS.

10. A method for communicating to and from a motorcycle, the method comprising:
 a) storing a list of one or more contacts, a vertical angle limit, and/or a predefined timer countdown in one or more memory units;
 b) using one or more microprocessors to connect to a Communication module, to connect to a GPS module, and to monitor one or more impact sensors and/or an angle/tilt sensor;
 c) determining from the monitoring of the one or more impact sensors if an impact has been detected;
 d) if the determination made in step (c), above, is that there has been an impact, then determining the motorcycle condition from the one or more impact sensors and/or the angle/tilt sensor, turning on one or more visual indicators, turning on one or more audible indicators, retrieving GPS coordinates from a GPS Module to determine location, and using the Communication module to communicate location and/or the motorcycle condition to at least one contact of the list of one or more contacts;
 e) if the determination made in step (c), above, is that there has not been an impact, then determining from the monitoring of the angle/tilt sensor if the vertical angle limit has been exceeded;
 f) if the determination made in step (e), above, is that the vertical angle limit has been exceeded, then beginning the predefined timer countdown, monitoring the predefined timer countdown while monitoring the vertical angle limit, and determining whether the predefined timer countdown has been completed;
 g) if the determination made in step (f), above, is that the predefined timer countdown has not been completed, then continue monitoring of the predefined timer countdown while monitoring the vertical angle limit until the predefined timer countdown has been completed and then proceeding to step (h), below;
 h) if the determination made in step (f), above, is that the predefined timer countdown has completed, then determining if the vertical angle limit is still exceeded;
 i) if the determination made in step (h), above, is that the vertical angle limit is not exceeded, then returning to step (b), above;
 j) if the determination made in step (h), above, is that the vertical angle limit is still exceeded, then determining the motorcycle condition from the one or more impact sensors and/or the angle/tilt sensor, turning on the one or more visual indicators, turning on the one or more audible indicators, retrieving GPS coordinates from the GPS Module to determine location, and using the Communication module to communicate location and/or the motorcycle condition to at least one contact of the list of one or more contacts; and
 k) if the determination made in step (e), above, is that the vertical angle limit has not been exceeded, then returning to step (b), above.

11. The method of claim 10, further comprising:
determining if a location inquiry by an inquirer has been received; and
if the determination is made that the location inquiry has been received, then retrieving GPS coordinates from the GPS Module to determine location, and using the Communication module to communicate location to the inquirer.

12. The method of claim 11, further comprising messaging an owner of the motorcycle a phone number of the inquirer.

13. The method of claim 10, further comprising:
determining if an activation of the one or more audible indicators and/or the one or more visual indicators has been received; and
if the determination is made that the activation of the one or more audible indicators and/or the one or more visual indicators had been received, then activating the one or more audible indicators and/or the one or more visual indicators.

14. The method of claim 10, further comprising:
determining if an arrival notification request has been received; and
if the determination is made that the arrival notification request has been received, then continuously retrieving GPS coordinates from the GPS Module until the GPS coordinates coincide with coordinates of the arrival notification request, and notifying requestor of arrival once GPS coordinates coincide with coordinates of the arrival notification request.

15. The method of claim 10, further comprising:
determining if a notification button has been triggered; and
if the determination is made that the notification button has been triggered, then retrieving GPS coordinates from the GPS Module to determine location and/or determining the motorcycle condition from the one or more impact sensors and/or the angle/tilt sensor, and using the Communication module to communicate to at least one contact of the list of one or more contacts the location and/or the motorcycle condition.

16. The method of claim 10, wherein the one or more audible indicators, the one or more visual indicators, the GPS module, the Communication module, and/or the one or more impact sensors comprise a mobile phone.

17. The method of claim 10, wherein at least one contact of the list of one or more contacts comprises an emergency responder.

18. The method of claim 10, wherein the Communication module comprises GSM, CDMA, and/or GPRS.

19. A helmet for alerting an occurrence of a motorcycle accident, the helmet comprising:
 a shell;
 one or more microprocessors integrated into the shell;
 one or more memory units coupled to the one or more microprocessors;
 one or more audible indicators coupled to the one or more microprocessors;

one or more visual indicators coupled to the one or more microprocessors;

a GPS module coupled to the one or more microprocessors;

a Communication module coupled to the one or more microprocessors;

one or more impact sensors coupled to the one or more microprocessors;

an angle/tilt sensor coupled to the one or more microprocessors; and one or more buttons and/or switches coupled to the one or more microprocessors;

the one or more microprocessors adapted to perform the steps of:

a) storing a list of one or more contacts, a vertical angle limit, and/or a predefined timer countdown in the one or more memory units;

b) connecting to a Communication module;

c) monitoring the one or more impact sensors and/or the angle/tilt sensor;

d) determining from the monitoring of the one or more impact sensors if an impact has been detected;

e) if the determination made in step (d), above, is that there has been an impact, then determining the motorcycle condition from the one or more impact sensors and/or the angle/tilt sensor, turning on the one or more visual indicators, turning on the one or more audible indicators, retrieving GPS coordinates from the GPS Module to determine location, and communicating location and/or the motorcycle condition to at least one contact of the list of one or more contacts;

f) if the determination made in step (d), above, is that there has not been an impact, then determining from the monitoring of the angle/tilt sensor if the vertical angle limit has been exceeded;

g) if the determination made in step (f), above, is that the vertical angle limit has been exceeded, then beginning the predefined timer countdown, monitoring the predefined timer countdown while monitoring the vertical angle limit, and determining whether the predefined timer countdown has been completed;

h) if the determination made in step (g), above, is that the predefined timer countdown has not been completed, then continue monitoring of the predefined timer countdown while monitoring the vertical angle limit until the predefined timer countdown has been completed and then proceeding to step (i), below;

i) if the determination made in step (g), above, is that the predefined timer countdown has completed, then determining if the vertical angle limit is still exceeded;

j) if the determination made in step (i), above, is that the vertical angle limit is not exceeded, then returning to step (c), above;

k) if the determination made in step (i), above, is that the vertical angle limit is still exceeded, then determining the motorcycle condition from the one or more impact sensors and/or the angle/tilt sensor, turning on the one or more visual indicators, turning on the one or more audible indicators, retrieving GPS coordinates from the GPS Module to determine location, and communicating location and/or the motorcycle condition to at least one contact of the list of one or more contacts; and l) if the determination made in step (f), above, is that the vertical angle limit has not been exceeded, then returning to step (c), above.

20. The helmet of claim 19, wherein the Communication module comprises GSM, CDMA, and/or GPRS.

* * * * *